(12) United States Patent
Boraas et al.

(10) Patent No.: US 7,540,509 B1
(45) Date of Patent: *Jun. 2, 2009

(54) FORCED EXTENSION CASTER ASSEMBLY

(75) Inventors: Michael Boraas, Elgin, MN (US);
Aaron Hegrenes, Rochester, MN (US);
Nathan Karl, Rochester, MN (US);
David Lund, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/273,941

(22) Filed: Nov. 19, 2008

Related U.S. Application Data

(63) Continuation of application No. 12/056,420, filed on Mar. 27, 2008, now Pat. No. 7,478,819.

(51) Int. Cl.
*B62B 3/02* (2006.01)

(52) U.S. Cl. ........................ 280/79.11; 16/30

(58) Field of Classification Search .......... 280/79.11, 280/79.3, 79.7, 47.34, 47.35, 43.2, 43.14, 280/43.24, 638, 35, 651, 763.1, 766.1; 403/395, 403/396, 388; 16/18 R, 19, 30, 40; 301/128
See application file for complete search history.

(56) References Cited

U.S. PATENT DOCUMENTS

| | | | | |
|---|---|---|---|---|
| 3,782,759 A | * | 1/1974 | Thune | 280/457 |
| 4,297,068 A | * | 10/1981 | Concha et al. | 414/458 |
| 4,555,880 A | * | 12/1985 | Gzym et al. | 52/126.4 |
| 4,927,105 A | * | 5/1990 | Habermann | 248/188.8 |
| 5,046,913 A | * | 9/1991 | Domek et al. | 414/522 |
| 5,457,849 A | | 10/1995 | Branson et al. | |
| 5,464,243 A | * | 11/1995 | Maiwald et al. | 280/638 |
| 5,745,951 A | * | 5/1998 | Waner | 16/31 R |
| 6,371,496 B1 | * | 4/2002 | Balolia | 280/35 |
| 6,591,449 B1 | * | 7/2003 | Parkin | 16/35 R |
| 6,637,071 B2 | * | 10/2003 | Sorensen | 16/32 |
| 7,163,214 B1 | * | 1/2007 | Bratton, Sr. | 280/79.11 |
| 7,249,738 B2 | * | 7/2007 | Kaczorowski | 248/129 |
| 7,374,186 B2 | * | 5/2008 | Mason et al. | 280/79.11 |

\* cited by examiner

*Primary Examiner*—Frank B Vanaman
(74) *Attorney, Agent, or Firm*—The Law Firm of Andrea Hence Evans, LLC

(57) ABSTRACT

A caster assembly with a horizontally orientated arm is attached to a base plate of a rack during a travel state and a stored state. A leveling foot with a flat portion and a non-flat portion is inserted through a slot on the arm and a hole on the base plate such that during the travel state, the horizontal orientated arm is in a fully extended position, and during the stored state, the horizontal orientated arm is in a non-extended position.

1 Claim, 5 Drawing Sheets

FORCED EXTENSION CASTER ASSEMBLY

RELATED APPLICATIONS

The present application is a continuation of prior U.S. Application No. 12/056,420, filed Mar. 27, 2008, the entirety of which is incorporated herein by reference.

FIELD OF THE INVENTION

The present invention generally relates to caster assemblies and in particular, extension caster assemblies for use with information technology server racks.

BACKGROUND OF THE INVENTION

Computer server products and their associated devices normally occupy enclosures that are referred to as racks. Racks provide space for housing equipment such as computer servers and other types of equipment. Racks are required to meet certain tip test standards These standards provide guidelines that each rack must comply with for its most extreme allowable server configuration. Drawer density may be defined by the configuration of various server products within a rack, along with the sheer density of components and hardware comprising each server. As drawer density increases and new configurations are offered, it becomes increasingly challenging to populate racks and still pass testing.

Increasing the foot print of a rack by add on extensions such as bolt on casters, out riggers, etc. have attempted to solve this problem, however these extensions require a significant amount of installation time as well as increase the cost of labor. Also, end users must find an area to store the extensions when not in use. The end users may discard the casters after initial installation and later move the rack using its permanent casters at a later date.

Some casters are permanently attached to the rack. However, they are in a fixed position, under the rack, which provides insufficient wheel base to safely move a fully loaded rack. Therefore, users are asked to depopulate the top portion of the rack to lower the center of gravity to make rack moving safer. Unfortunately, depopulating the top portion of the rack is not a very desirable option (requires un-cabling, forces manual moving of those components and requires a re-assembly option).

SUMMARY OF THE INVENTION

It is an aspect of an embodiment of the present invention to provide a system for supporting a rack in a stored state and a travel state, the rack having a base plate, the base plate having a hole and a tube. The system comprises a caster assembly having a horizontal orientated arm, wherein the caster assembly is slid into the tube, the horizontal orientated arm having a slot.

The system further comprises a leveling foot having a flat portion and a non-flat portion inserted through the slot and the hole such that during the travel state, the horizontal orientated arm is in a fully extended position and the non-flat portion of the foot engages a first end of the slot, and during the stored state, the horizontal orientated arm is in a non-extended position and the flat portion of the foot is positioned at a second end of the slot.

Additional aspects, objectives, and features of the present invention will become apparent from the following description of the preferred embodiments with reference to the attached drawings.

DETAILED DESCRIPTION OF THE INVENTION

Figure 2:
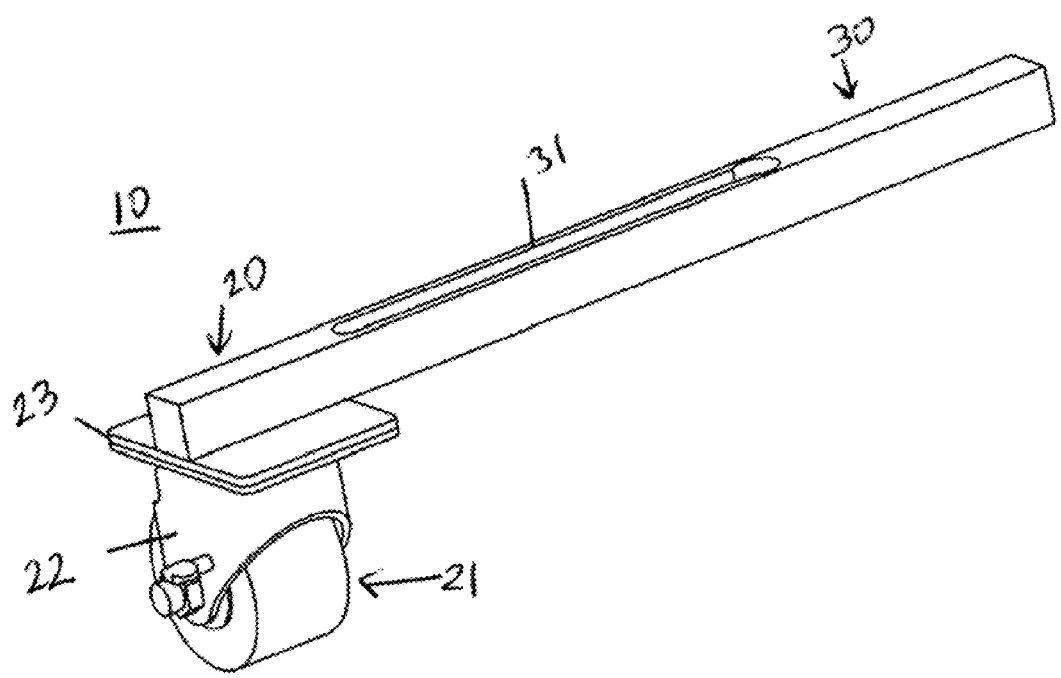
FIG. 2 illustrates the caster assembly of the present invention.

Referring to FIG. 2, the caster assembly 10 of the present invention is shown. The caster assembly 10 is comprised of a wheel assembly 20 and a horizontal orientated arm 30. The material of the arm is determined by the load each caster assembly will need to withstand. The length of the arm 30 is to be determined by the dimensions and weight of any given rack. The wheel assembly includes a wheel 21, wheel bracket 22, and a wheel plate 23. The wheel bracket 22 acts as a cover and secures the wheel 21. The horizontal orientated arm 30 extends along the x-axis relative to the wheel assembly 20, along a straight line path. The arm 30 is bolted to the wheel plate 23, however, alternate attachment methods known in the art are feasible. The arm 30 has slot 31 in the form of a keyhole slot. The rounded section of the keyhole slot 31 is a clearance hole for the leveling foot shaft 40, shown in FIG. 3. The slot 31 extends along the top portion of the arm 30 in a horizontal and linear direction. The width of the slot 31 is based on the size of the arm 30 and the size of the leveling foot shaft 40.

Figure 3:
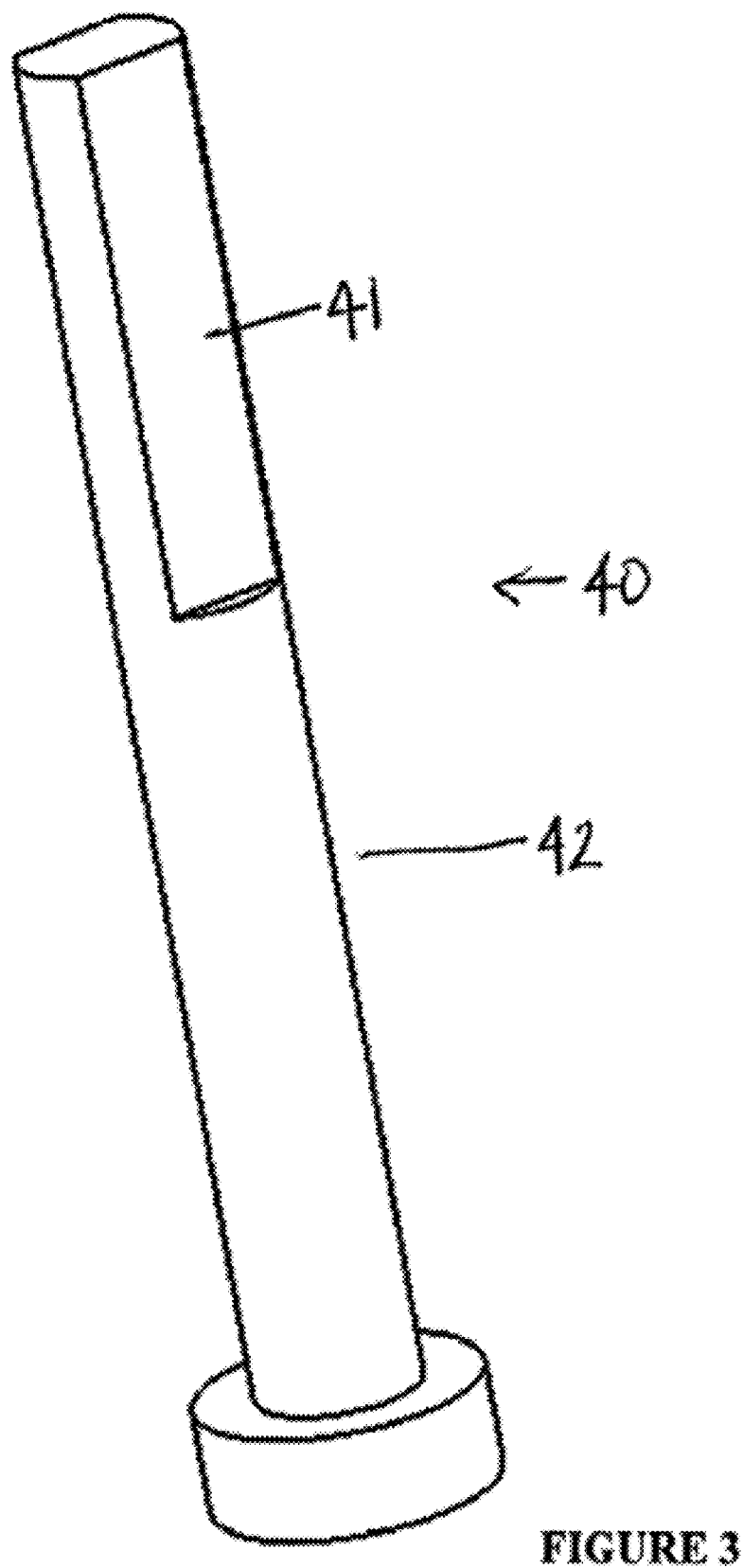
FIG. 3 illustrates the leveling foot of the present invention.

As shown in FIG. 3, the leveling foot shaft 40 is threaded from top to bottom. The shaft 40 has a flat portion 41 and a non-flat portion 42. The flat portions 41 of the shaft 40 are grounded down to a length such that the flat portion 41 ends when the bottom of the leveling foot 40 is even with the wheel 21. The shaft 40 size is to be determined by the rack weight and the required strength of each leveling foot shaft 40. The leveling foot shaft 40 is not directly attached to the extension arm 30. The shaft 40 screws into the base plate 50 through hole 52, shown in FIG. 4, and is not allowed to clear the floor until the caster arm 30 has been fully extended from underneath the rack.

Figure 4:
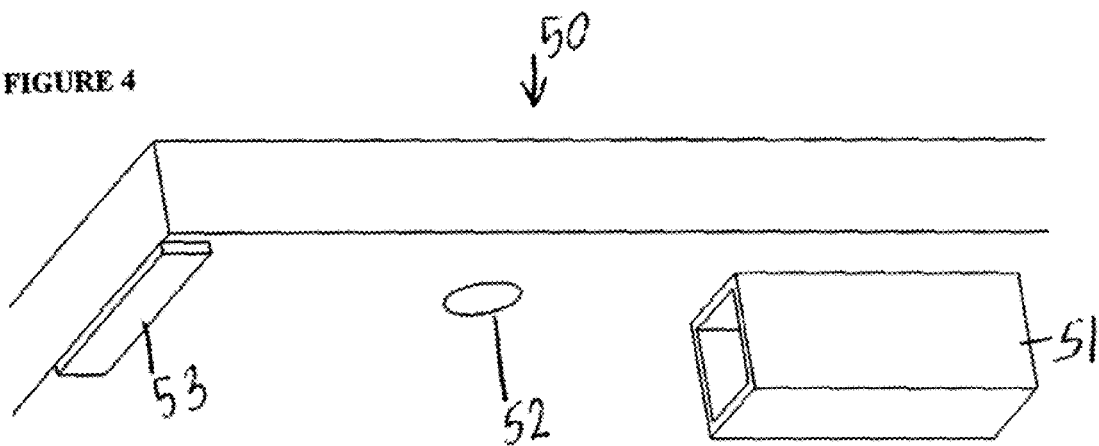
FIG. 4 illustrates the base plate of the present invention.

The base plate 50 is shown in FIG. 4. The base plate 50 is attached to the rack (not shown). The base plate 50 comprises a hollow tube steel 51 sized to receive the arm 30. The tube steel 51 acts as a guide to position the arm underneath the base plate 50. The inner dimensions of the tube steel 51 is slightly larger than the outer dimensions of the arm 30, thus allowing some clearance to avoid friction. The plate 50 also comprises a threaded hole 52. The threads on the leveling foot 40 matches the threads in the hole 52 when the leveling foot is inserted and screwed into the hole 52. A pad of steel 53 is located on the bottom edge of the base plate 50. The pad of steel 53 is a small, flat, rectangular piece attached near the edge of the base plate 50. The pad of steel 53 keeps the arm 30 level with the thickness of the steel on the tube steel 51 and fills the gap between the arm 30 and the base plate 50.

Figure 5:
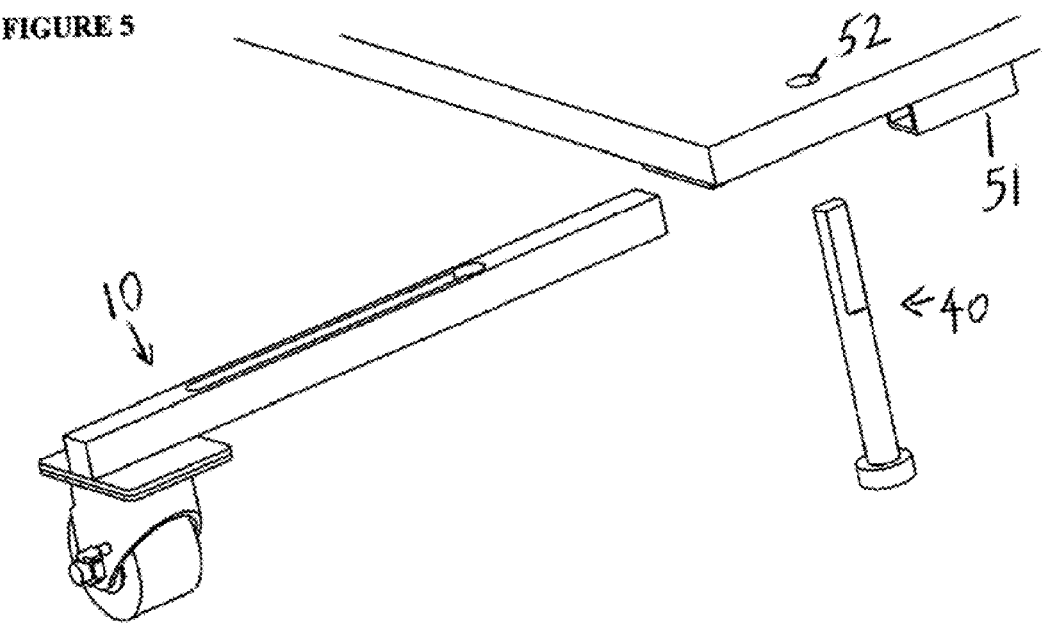
FIG. 5 is an exploded view of the caster assembly, base plate and the leveling foot shaft.

FIG. 5 illustrates an exploded view of the caster assembly 10, base plate 50 and the leveling foot shaft 40. The leveling foot shaft 40 is received by tile slot 41 in the arm and a hole 52 on a base plate. The leveling foot 40 is manually screwed up and down by the user. However, automatic screwing mechanisms known in the art may be used. The foot 40 can reside at a height that can be determined by the user. The caster assembly 10 is secured to the base plate 50 of the rack during a stored state and a travel state.

Figure 1:
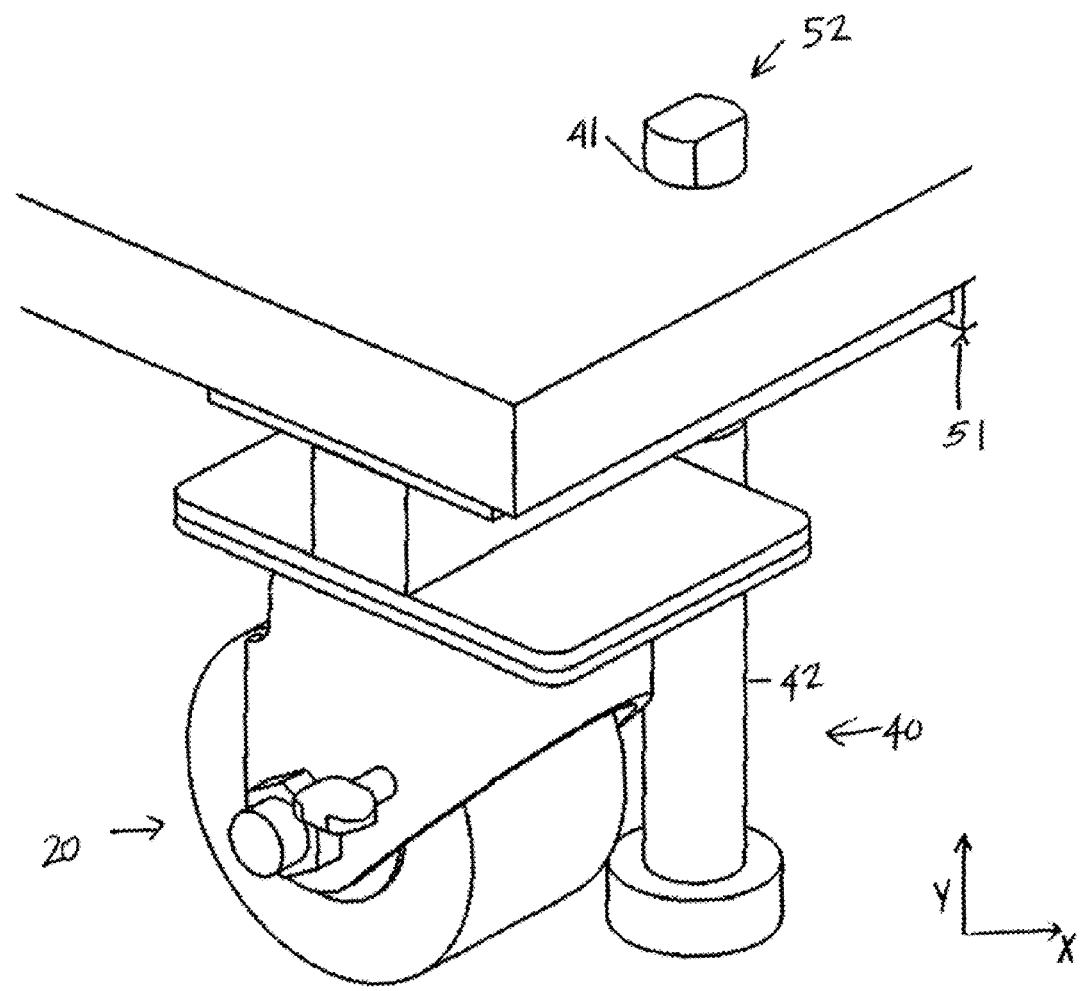
FIG. 1 is a perspective view of the caster assembly in a stored slate.

The stored state of the caster assembly is shown in FIG. 1. During the stored state, the rack is in a fixed non-movable position. During the stored state, the wheel assembly 20 is raised off the floor by the leveling foot 40 such that the rack cannot move. The horizontal orientated arm 30 is in a non-extended position and the leveling foot 40 is positioned through the slot 31 of the arm 30 and the hole 52 on the base plate 50 such that the flat portion 41 is in the slot 31 and the hole 52. The flat portion 41 on the leveling foot 40 allows the extension arm 30 to be slid and positioned fully underneath the base plate 50.

Figure 6:
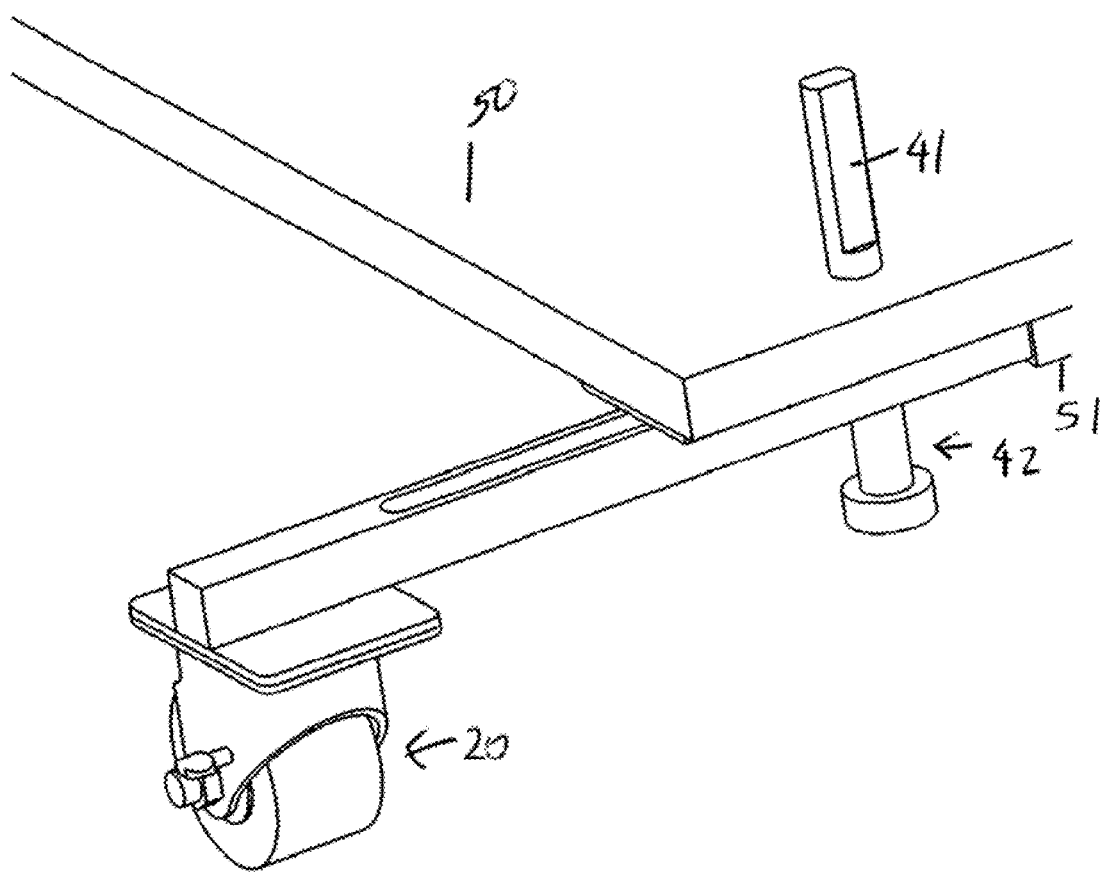
FIG. 6 illustrates the caster assembly in a travel state.

The travel state of the caster assembly is shown in FIG. 6. Once the caster assembly 20 is pulled out to a full extension, the leveling foot 40 may be raised a distance desired by the user. The weight of the rack will now be on the caster assembly 20, and the leveling foot 40 need only clear the floor to avoid dragging and to allow smooth travel of the rack. In order to raise the leveling foot 40 a height to allow the wheel assembly 20 to engage the floor, the extension arm 30 must be fully extended. At full extension, the rounded section of tile slot 31 is aligned with the non-flat portion 42 of the leveling foot 40. During the travel state, the horizontal orientated arm 30 is in a fully extended position and the leveling foot 40 is positioned through the arm 30 such that the non-flat portion 42 is in the slot 31 and the hole 52.

The extension arm 30 of the present invention is illustrated with a straight line path. However, in an alternative embodiment, the arm may travel along a radial path. Such a solution would allow the wheel assembly to swing out from under the rack, which would require a semi-circular keyhole slot as opposed to the linear slot illustrated in the figures. Also, the shape of the arm, such as a curved arm, as well as the path the arm follows during user interaction may be modified accordingly.

The invention has been described in detail with particular reference to certain preferred embodiments thereof, but it will be understood that variations and modifications can be effected within the spirit and scope of the invention.

The invention claimed is:

1. A system for supporting a rack in a stored state and a travel state, the rack having a base plate, the base plate having a hole and a tube, the system comprising:
    a caster assembly having a horizontally orientated arm, wherein the caster assembly is slid into the tube, the horizontally orientated arm having a slot;
    a leveling foot having a flat portion and a non-flat portion inserted through the slot and the hole such that during the travel state, the horizontally orientated arm is in a fully extended position and the non-flat portion of the foot engages a first end of the slot,
    and during the stored state, the horizontally orientated arm is in a non-extended position and the flat portion of the foot is positioned at a second end of the slot.

* * * * *